Figure 1:
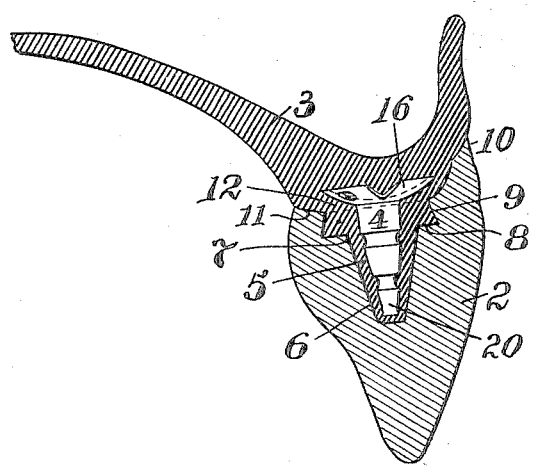

J. L. WILLIAMS.
DENTURE AND TOOTH THEREFOR
APPLICATION FILED JAN. 29, 1920.

1,397,192. Patented Nov. 15, 1921.

Inventor.
James Leon Williams
By
Attorney

UNITED STATES PATENT OFFICE.

JAMES LEON WILLIAMS, OF NEW YORK, N. Y., ASSIGNOR TO THE DENTISTS' SUPPLY COMPANY, A CORPORATION OF NEW YORK.

DENTURE AND TOOTH THEREFOR.

1,397,192.     Specification of Letters Patent.     Patented Nov. 15, 1921.

Application filed January 29, 1920. Serial No. 354,979.

*To all whom it may concern:*

Be it known that I, JAMES LEON WILLIAMS, a citizen of the United States, and resident of New York city, county of New York and State of New York, have invented an Improvement in Dentures and Teeth Therefor, of which the following is a specification.

The object of my invention is to provide a construction of denture and artificial tooth therefor, which will be stronger and more satisfactory in use than dentures made with teeth having baked-in or soldered pins.

My object is further to provide a means for attaching crown teeth to vulcanite plates in such manner that, while providing necessary strength, will also secure a naturalness in the teeth both upon the buccal and lingual sides, the teeth presenting shape and conformation, especially the lingual surface, whereby the lisping and thickness of speech, so frequently resulting in dentures as heretofore made, is entirely eliminated.

By my invention, the teeth employed with the vulcanite plate are crown teeth and hence the frontal teeth are exposed both on the buccal and lingual surfaces and this provides a most natural appearance, in that there is no backing required, nor in fact a tight sealing of the juncture of adjacent teeth between the incisal ends and the necks of the teeth at which latter place the vulcanite plate begins.

In construction, the tooth crown and anchor pin to be employed, consists in a crown approximating both the buccal and lingual conformations of natural teeth and providing a hole in the crown which is preferably oval in plan outline and having greater width mesio-distally at the bottom than at the entrance to provide an undercut structure with a relatively narrow width bucco-lingually, said crown combined with an anchor pin fitting the hole and having its lower end flattened to a fan-tail shape, whereby it may engage the special shape of the lower portion of the hole in the crown and be secured therein, by being embedded in rubber, and so securely united that rotation of the tooth upon the pin can never occur. The structure further provides the projecting end of the pin with a dish shaped flange or head which is preferably notched and adapted to be embedded in the vulcanite of the plate for holding the tooth crown firmly to the vulcanite, and, by reason of the notched construction, preventing it from rotating upon its seat in the vulcanite.

My invention also consists of improvements hereinafter described whereby the above objects and results are attained, said improvements comprising certain organization and combination of parts which are fully described hereinafter and more particularly defined in the claims.

Figure 2:
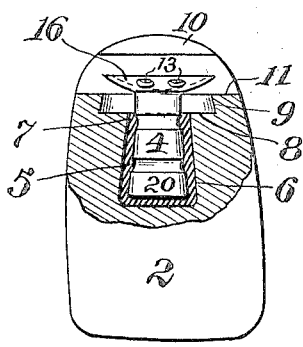
Figure 3:
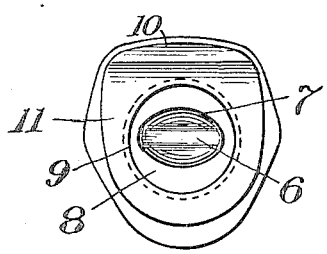
Figure 5:
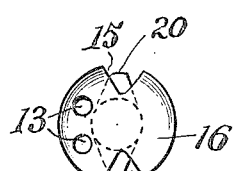
Figure 6:
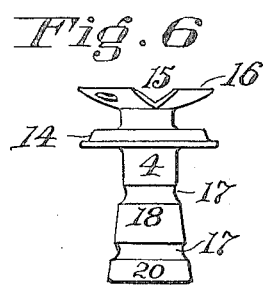
Figure 4:
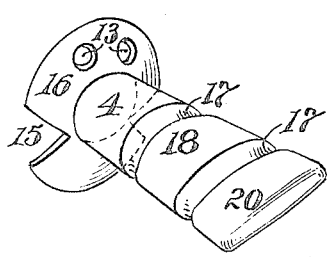

Referring to the drawings: Figure 1 is a vertical sectional view through a plate and tooth taken in a plane bucco-lingually of the denture; Fig. 2 is a view of the crown tooth, partly in section, with the anchoring pin in place ready for attachment to the vulcanite plate; Fig. 3 is a plan view of the tooth and anchor associated; Fig. 4 is a perspective view of the anchor alone; Fig. 5 is a plan view of my improved anchoring pin; and Fig. 6 is an elevation of a modified construction of anchor which may be employed with the tooth crowns shown.

2 is the tooth crown, 3 is the vulcanite of the plate to fit the gums and 4 is the anchoring pin for securing the crown to the vulcanite. Considering the special shape of the anterior teeth and the special advantages of my improved anchoring feature, the following statement is in point. At the neck, the greatest diameter of the anterior teeth (for which the great majority of porcelain crowns are made) is bucco-lingually, but the greatest diameter of the incisal half of the crown is in the opposite direction, that is to say, mesio-distally; and by reason of this fact, objection arises to the old style of pin, which, in the part entering the crown, is of the same diameter throughout, because the hole which receives the pin, if continued a sufficient depth into the porcelain to make the hold secure, it often and especially in short teeth, nearly cuts through the lingual surface of the procelain tooth and thereby greatly weakens it. It is also often found necessary, in order to get proper occlusion, to grind the lingual surface of the porcelain crown and in doing this the pin hole is sometimes exposed through the tooth wall. Thus, by the removal of porcelain of the pin hole and by the exposure of the cement which fastens the pin to the crown to the disintegrating action of the saliva, there results a double weakening of crown and attachment.

The crown 2 is provided at its neck portion with a relatively flat surface 11 curving upward at the buccal side to form the buccal edge 10 which fits snugly to the vulcanite plate. The surface 11 has an opening through it and extended inwardly into the tooth body as a hole 6, which, at the point 7 where the pin enters, is preferably made oval in outline (Fig. 3) to admit the flattened and widened end 20 of the pin 4; and the bottom of the hole is widened mesio-distally of the tooth and flattened bucco-lingually, as will be understood by reference to Figs. 1 and 2. The hole 6 is preferably surrounded with a recessed portion of vestibule 8 having undercut side walls 9. Both the recess 8 and the deeper part of the hole 6 are undercut and thereby insure a very secure locking of the crown to the vulcanite plate, and especially by reason of the pin 4 being firmly secured to the crown by being held therein with rubber 5 filling the undercut of the hole, and said pin, through its head 16, engaging the vulcanite plate. While the recess 8 and its walls 9 are shown as circular, they may be of any other shape in plan, if so desired.

Referring more specifically to the anchoring pin 4, the pin shank 18, which enters the hole 6, is substantially circular at its upper part and flattened at its lower end 20, so as to be of fan-tail shape, this shank being also grooved, as at 17, to give a better hold to the rubber by which it is secured in position. The upper end of the pin has a concave head 16 having notches 15 in its edge and preferably also perforations 13 (Figs. 4 and 5). This head 16 extends slightly above the surface 11 of the crown and above the recess 8 thereof when in position (Fig. 2), and its relation is such as to permit sufficient amount of rubber to flow around the head and under it, filling the space 12 and recess 8, so as to obtain great strength of attachment. The rubber, fitting the notches 15 of the head 16 and extending through the holes or perforations 13, securely holds the pin from rotating upon the plate, and hence the crown cannot rotate. This resistance to rotation is also assisted by reason of the fact that the buccal edge 10 extends upward and hence locks with the vulcanite.

The method of procedure in vulcanite work is as follows:—When all of the required teeth have been fitted and mounted to the base plate, the case is invested in the vulcanizing flask in the usual way. After the plaster in the flask is sufficiently hard, the flask is opened, the pins removed and wax cleaned out with hot water in the usual way. The holes in the crowns are then nearly but not quite filled with rubber and the heated pins forced into the rubber until they are in proper position. The packing of the case is then completed, vulcanized and finished in the usual manner.

While the anchor pin 4 is preferably made without means to contact with the floor of the recess 8, as will be understood from Figs. 1 and 2, nevertheless, if desired, the pin may be provided with a flange or shoulder part 14, Fig. 6, which may rest upon the floor of recess 8 to provide greater rigidity, and this will result by employing the pin of Fig. 6 in the crown structure of Figs. 1 and 2.

In this application, I do not claim the structure *per se* of the crown tooth itself, as that forms subject matter of another application, Serial Number 354,980, filed January 29, 1920; but when said crown structure is combined with my special anchoring pin in association with vulcanite plate work, I secure valuable advantageous results involving novel features of construction not specifically set out in said application.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. A denture comprising a vulcanite plate to fit the jaw, combined with a crown tooth having its neck end alone fitted to the plate, and a metal anchoring pin secured to the crown tooth and projecting above its surface thereof which is in contact with the vulcanite plate and said projecting anchoring pin provided with a transversely arranged head embedded in the vulcanite plate for securing the tooth thereto.

2. The invention according to claim 1, having the transversely arranged head of the pin made dish shaped and notched on its side edges.

3. The invention according to claim 1, further distinguished by having the head of the pin made thin and provided with a perforation through which the vulcanite may extend.

4. The invention according to claim 1, characterized by having the crown tooth formed with a deep hole which is elongated mesio-distally at its lower part and the pin flattened at its lower part to correspond in general shape to the hole in the tooth and secured therein by a vulcanite between the pin and the walls of the hole in the tooth.

5. A denture comprising a vulcanite plate shaped to fit the jaw, combined with a crown tooth having its transverse surface adjacent to the neck portion abutting against the plate and having an undercut hole structure extending into the body of the tooth from the said transverse surface, and an anchoring pin secured in the undercut recess by means of rubber compound, and having its end extended beyond the tooth and embedded in the vulcanite, said end having lateral projections extending into the body of the vulcanite, whereby the crown pin is strongly attached to the vulcanite plate.

6. A crown tooth adapted for use with vulcanite plates, having a hole extending inwardly from the neck end and formed with an undercut wall, combined with a pin fan-shaped to fit the hole and secured therein by a filling of plastic material which becomes hardened, the outer end of said pin beyond the crown tooth provided with a transversely arranged head to be embedded in the vulcanite.

7. The invention according to claim 6, characterized by having the head of dish shape.

8. The invention according to claim 6, further characterized by having the head formed with a transverse flange having its edge notched.

9. An anchoring pin for connecting crown teeth with a vulcanite plate, consisting of a metal shank flattened at one end where it enters the tooth and having the other end provided with a thin head arranged transversely to the axis of the pin, whereby a broad transverse anchoring part is provided for embedding in the vulcanite.

10. The invention according to claim 9, further characterized by having the head made dish shaped transversely to the length of the flattened end of the pin and the edges of the said head notched.

11. The invention according to claim 9, further characterized by having the transverse head formed with an aperture through the same between its periphery and the pin shank.

12. The invention according to claim 9, further characterized by having the head made upwardly curved at its edges to constitute a dish shaped head.

13. A denture comprising a vulcanite plate shaped to fit the jaw, combined with a crown tooth having its transverse surface adjacent to the neck portion abutted to the plate and provided with an undercut hole extending into the body of the tooth from the said transverse surface, and an anchoring pin secured in the undercut recess, said pin having its end extended beyond the tooth and provided with lateral projecting portions extending into and embedded solidly in the body of the vulcanite, the vulcanite of the plate extending continuously into the hole in the tooth crown and securing the pin therein, whereby the pin is strongly attached both to the crown and vulcanite plate and the vulcanite assists in directly anchoring the crown in position.

In testimony of which invention, I hereunto set my hand.

JAMES LEON WILLIAMS.